(12) United States Patent
Arthur et al.

(10) Patent No.: US 10,780,541 B2
(45) Date of Patent: Sep. 22, 2020

(54) VACUUM DUST EXTRACTION APPARATUS FOR A PERCUSSIVE AIR TOOL

(71) Applicants: Robert Arthur, Trenton, MI (US); James Robert Arthur, Trenton, MI (US); Kenan Wollborg, Inkster, MI (US); Nicholas J. Russell, Kirtland, OH (US)

(72) Inventors: Robert Arthur, Trenton, MI (US); James Robert Arthur, Trenton, MI (US); Kenan Wollborg, Inkster, MI (US); Nicholas J. Russell, Kirtland, OH (US)

(73) Assignee: G.A.W. Inc., Romulus, MI (US)

( * ) Notice: Subject to any disclaimer, the term of this patent is extended or adjusted under 35 U.S.C. 154(b) by 217 days.

(21) Appl. No.: 16/025,457

(22) Filed: Jul. 2, 2018

(65) Prior Publication Data
US 2019/0076973 A1    Mar. 14, 2019

Related U.S. Application Data

(60) Provisional application No. 62/666,789, filed on May 4, 2018, provisional application No. 62/555,909, filed on Sep. 8, 2017.

(51) Int. Cl.
*B23Q 11/00* (2006.01)
*B25D 17/20* (2006.01)
*B21J 15/50* (2006.01)

(52) U.S. Cl.
CPC .......... *B23Q 11/0046* (2013.01); *B21J 15/50* (2013.01); *B23Q 11/0071* (2013.01); *B25D 17/20* (2013.01); *B25D 2217/0065* (2013.01); *B25D 2250/265* (2013.01)

(58) Field of Classification Search
CPC ............ B23Q 11/0046; B23Q 11/0071; B25D 17/20; B25D 2250/265; B25D 2217/0065; B21J 15/50
USPC ........................................................ 173/198
See application file for complete search history.

(56) References Cited

U.S. PATENT DOCUMENTS

| | | | | |
|---|---|---|---|---|
| 2,246,916 A | * | 6/1941 | Fischer | B23Q 11/0046 408/56 |
| 3,339,435 A | | 9/1967 | Heitz | |
| 3,638,737 A | * | 2/1972 | Moates | B23Q 11/0046 173/60 |
| 3,646,712 A | * | 3/1972 | Quintana | B24B 55/102 451/456 |
| 3,724,561 A | * | 4/1973 | Merrels | B25F 3/00 173/50 |
| 3,930,281 A | * | 1/1976 | Principe | A47L 11/30 15/320 |
| 3,964,212 A | | 6/1976 | Karden | |

(Continued)

*Primary Examiner* — Robert F Long
(74) *Attorney, Agent, or Firm* — Mark A. Navarre

(57) ABSTRACT

A vacuum dust extraction system includes a snorkel coupled to the implement end of an air tool, a dust bellows surrounding the air tool's implement and fastened to the outboard end of the snorkel, a pneumatically powered water filtration industrial vacuum, and a suction hose coupling the snorkel to the vacuum. The apparatus features an improved coupling arrangement for attaching the snorkel to the barrel of the tool driver that permits the apparatus to work with a wide assortment of air tools, and an improved water filtration apparatus housed in the vacuum.

10 Claims, 5 Drawing Sheets

(56) References Cited

U.S. PATENT DOCUMENTS

| | | | | |
|---|---|---|---|---|
| 4,124,956 A | * | 11/1978 | Levinson | B24B 55/102 451/358 |
| 4,215,601 A | * | 8/1980 | Mann | B25B 27/00 81/57.13 |
| 4,232,487 A | * | 11/1980 | Brown | B24C 5/02 451/88 |
| 4,330,279 A | * | 5/1982 | Heil | A61C 1/052 433/126 |
| 4,333,277 A | * | 6/1982 | Tasedan | B24C 3/065 451/101 |
| 4,344,606 A | * | 8/1982 | Dillon | B23K 7/08 266/66 |
| 4,574,432 A | * | 3/1986 | Jacob | A22C 21/02 452/101 |
| 4,608,017 A | * | 8/1986 | Sadohara | A61C 5/40 433/81 |
| 4,841,643 A | * | 6/1989 | Colella | B23D 51/02 30/393 |
| 4,955,984 A | | 9/1990 | Cuevas | |
| 4,959,146 A | * | 9/1990 | Kristan | B01D 29/33 210/237 |
| 4,989,323 A | * | 2/1991 | Casper | A01D 34/902 30/276 |
| 5,025,559 A | * | 6/1991 | McCullough | B26B 25/002 30/1 |
| 5,069,695 A | * | 12/1991 | Austin | B23Q 11/0046 144/252.1 |
| 5,239,783 A | * | 8/1993 | Matechuk | B24B 7/184 451/354 |
| 5,265,340 A | * | 11/1993 | Nitz | B23D 59/006 30/166.3 |
| 5,423,799 A | * | 6/1995 | Shiu | A61B 17/320758 606/159 |
| 5,545,074 A | * | 8/1996 | Jacobs | B24C 3/065 451/102 |
| 5,645,540 A | * | 7/1997 | Henniges | A61M 1/0023 604/118 |
| 5,688,082 A | * | 11/1997 | Richardson | B23Q 11/0046 408/113 |
| 5,775,979 A | * | 7/1998 | Coke | B24C 3/065 451/354 |
| 5,795,216 A | * | 8/1998 | Graves | B24B 55/102 451/356 |
| 5,820,464 A | * | 10/1998 | Parlato | F16C 1/04 464/58 |
| 5,954,863 A | * | 9/1999 | Loveless | A47L 5/365 15/353 |
| 6,041,462 A | * | 3/2000 | Marques | A46B 13/008 134/140 |
| 6,193,448 B1 | * | 2/2001 | Brennan | B23Q 11/0053 408/67 |
| 6,216,312 B1 | * | 4/2001 | Rowan | A47L 11/03 15/321 |
| 6,315,557 B1 | * | 11/2001 | Messick | A61C 1/0015 433/82 |
| 6,332,891 B1 | * | 12/2001 | Himes | A61B 90/36 606/130 |
| 6,432,305 B1 | * | 8/2002 | Sumner | B01D 35/0273 210/232 |
| 6,451,017 B1 | * | 9/2002 | Moutafis | A61B 17/32037 604/35 |
| 6,500,057 B1 | * | 12/2002 | Medina | B24B 7/184 451/354 |
| 6,793,563 B2 | * | 9/2004 | Daniel | B24C 5/02 451/90 |
| 7,178,217 B2 | * | 2/2007 | Barnett | B23C 3/30 29/557 |
| 7,220,174 B2 | * | 5/2007 | Phillips | B24B 7/184 451/354 |
| 7,238,021 B1 | * | 7/2007 | Johnson | A61C 1/16 433/1 |
| 7,503,134 B2 | * | 3/2009 | Buckner | E01H 1/0827 15/300.1 |
| 7,549,913 B2 | * | 6/2009 | Weiford | B24B 7/184 451/354 |
| 7,740,086 B2 | | 6/2010 | Bleicher et al. | |
| 7,901,164 B2 | | 3/2011 | Skradski et al. | |
| 9,022,702 B2 | | 5/2015 | Kasuya et al. | |
| 9,579,762 B2 | * | 2/2017 | Sullivan | B25F 3/00 |
| 9,981,360 B2 | * | 5/2018 | Roeck | B24B 23/02 |
| 2002/0154960 A1 | | 10/2002 | Lin | B23Q 11/0046 408/67 |
| 2002/0169467 A1 | * | 11/2002 | Heitzmann | A61B 17/320758 606/159 |
| 2003/0111266 A1 | * | 6/2003 | Roach | B23Q 9/0078 175/57 |
| 2003/0116354 A1 | * | 6/2003 | Yamashita | B23Q 11/0057 175/17 |
| 2003/0155141 A1 | * | 8/2003 | Maras | B25F 3/00 173/29 |
| 2004/0060145 A1 | * | 4/2004 | Hayama | A47L 9/2894 15/339 |
| 2005/0034715 A1 | * | 2/2005 | Terpstra | B23Q 11/0046 125/13.01 |
| 2005/0108849 A1 | * | 5/2005 | Lam | A47L 5/362 15/353 |
| 2007/0022563 A1 | * | 2/2007 | Wu | A47L 5/24 15/344 |
| 2007/0219484 A1 | * | 9/2007 | Straub | A61B 17/320783 604/35 |
| 2007/0264091 A1 | * | 11/2007 | Bleicher | B23Q 11/0046 408/58 |
| 2007/0274858 A1 | * | 11/2007 | Childers | A61L 2/24 422/28 |
| 2008/0202781 A1 | * | 8/2008 | Nishikawa | B25H 1/0078 173/104 |
| 2009/0183336 A1 | * | 7/2009 | Kunz | A47L 7/0095 15/339 |
| 2009/0183887 A1 | * | 7/2009 | Baber | B23B 45/005 173/1 |
| 2010/0186852 A1 | * | 7/2010 | Shepherd | B23Q 11/0046 144/252.1 |
| 2010/0192980 A1 | * | 8/2010 | Turner | A47L 5/365 134/21 |
| 2012/0029281 A1 | * | 2/2012 | Frassica | A61B 1/00154 600/114 |
| 2012/0063856 A1 | * | 3/2012 | Miwa | B23Q 11/0046 408/67 |
| 2012/0121354 A1 | * | 5/2012 | Dickey | B23Q 11/0046 409/131 |
| 2012/0311811 A1 | * | 12/2012 | Hollis | A47L 7/0023 15/327.1 |
| 2013/0115863 A1 | * | 5/2013 | Mizutani | B24B 55/10 451/456 |
| 2014/0008087 A1 | * | 1/2014 | Brown | B23Q 41/00 173/1 |
| 2014/0058361 A1 | * | 2/2014 | Gordon | A61B 17/3203 604/542 |
| 2014/0093320 A1 | * | 4/2014 | Sullivan | B25F 3/00 408/67 |
| 2014/0138114 A1 | * | 5/2014 | Takeuchi | B25F 5/026 173/198 |
| 2014/0304939 A1 | * | 10/2014 | Suzuki | A47L 9/28 15/339 |
| 2015/0152704 A1 | * | 6/2015 | Tunget | E21B 28/00 166/254.2 |
| 2016/0084083 A1 | * | 3/2016 | Hice | E21B 7/18 299/1.05 |
| 2020/0055154 A1 | * | 2/2020 | Arthur | B23Q 11/0046 |
| 2020/0087940 A1 | * | 3/2020 | Xu | E04H 4/1636 |

* cited by examiner

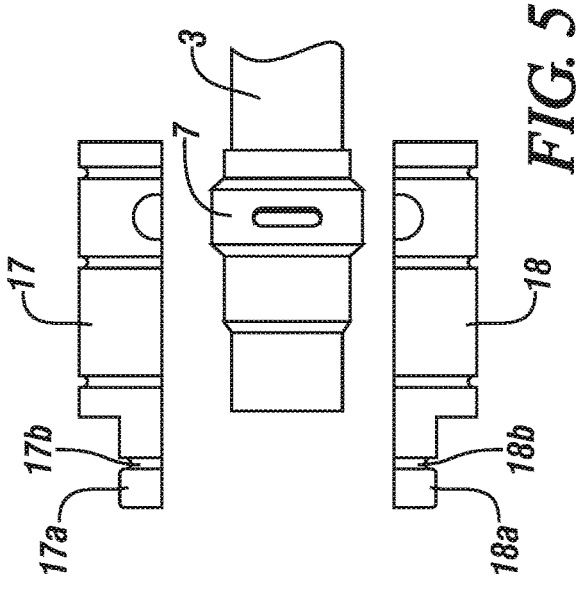
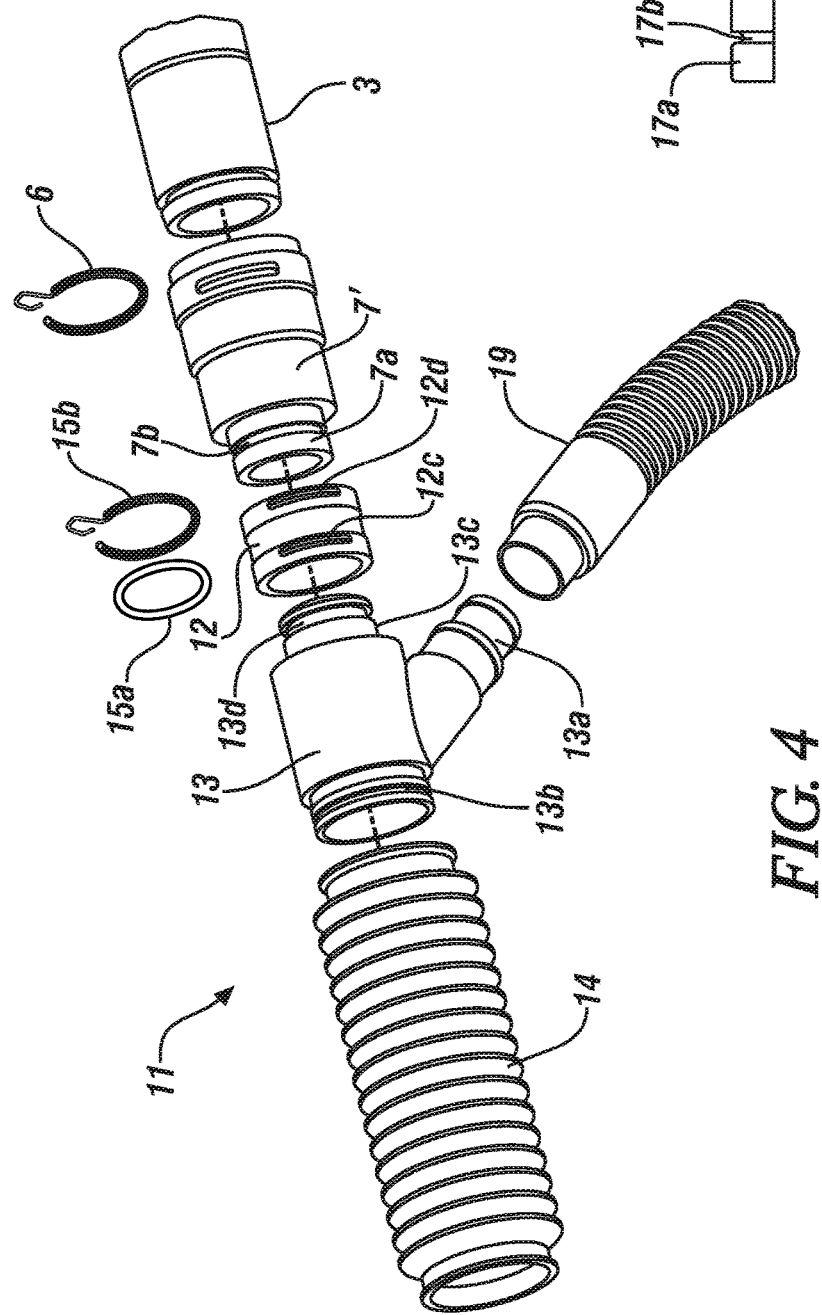
FIG. 5
FIG. 4

VACUUM DUST EXTRACTION APPARATUS FOR A PERCUSSIVE AIR TOOL

RELATED APPLICATIONS

This application claims priority based on the Provisional Patent Application No. 62/555,909, filed Sep. 8, 2017, and the Provisional Patent Application No. 62/666,789, filed May 4, 2018.

TECHNICAL FIELD

This invention relates to a vacuum dust extraction apparatus for a percussive air tool such as a chisel hammer or rivet buster.

BACKGROUND OF THE INVENTION

Pneumatically operated percussive air tools such as pick or chisel hammers, rivet busters, and so forth are frequently used in industrial applications, and various expedients have been employed to minimize or contain airborne dust produced by the impacting action of the tool. As disclosed, for example, in the U.S. Pat. No. 7,740,086 to Bleicher et al. and U.S. Pat. No. 9,022,702 to Kasuya et al., this can be achieved with a dust containment hood attached to the implement end of the air tool's housing and an industrial vacuum that draws dust out of the dust containment hood and captures it for later disposal.

While this approach is effective, it is not particularly practical because industrial vacuums typically rely on mechanical filtration in the form of paper cartridges or other filter elements that either fail to filter out or become quickly clogged by small dust particles of the sort generated by the operation of a percussive air tool. Additionally, air tools can vary considerably depending on their rating and type, so that a dust containment hood designed to work with one type of air tool will not necessarily work with other air tools. Accordingly, what is needed is an improved vacuum dust extraction apparatus including an industrial vacuum uniquely suited to industrial worksites and extraction of percussive air tool dust, and a more universal coupling arrangement for attaching the dust containment portion of the apparatus to the air tool.

SUMMARY OF THE INVENTION

The present invention is directed to an improved vacuum dust extraction apparatus for a percussive air tool for removing and capturing workpiece dust created by the impacting action of the air tool's implement. The improved system includes a snorkel coupled to the implement end of the air tool, a dust bellows surrounding the implement and fastened to the outboard end of the snorkel, an air-powered water filtration industrial vacuum, and a suction hose coupling the snorkel to the vacuum.

The apparatus features an improved coupling arrangement for attaching the dust containment portion of the apparatus (that is, the snorkel and bellows) to the air tool in a way that permits the dust containment portion of the apparatus to work with a wide assortment of air tools. The improved coupling arrangement includes a tubular coupler removably joined at one end to a cylindrical sleeve on the snorkel and at the other end to a cylindrical sleeve on the air tool. Both cylindrical sleeves have the same outside diameter, and each is provided with a circumferential groove on its exterior periphery. The tubular coupler has a pair of spaced circumferential grooves on its interior periphery that align with the circumferential grooves of the sleeves when the cylindrical sleeves are inserted into opposite ends of the coupler, and retainer springs inserted into slot openings in the coupler slip into annular spaces defined by the aligned circumferential grooves to securely join the dust containment portion of the apparatus to the air tool. In a first embodiment, the cylindrical sleeve of the air tool is an extended outer sleeve of a rivet buster; in a second embodiment, the cylindrical sleeve of the air tool is a modified retainer of a chisel hammer, and in a third embodiment, the cylindrical sleeve of the air tool is a clamshell adapter that fits over an air tool's retainer.

The apparatus also features an improved industrial vacuum that creates adequate suction for removing dust while efficiently filtering the dust from the suction airflow. The improved vacuum includes a canister partially filled with water (referred to herein as the confined water), an air inlet port coupled to the dust containment hood portion of the apparatus via the suction hose, a vacuum unit mounted on the lid of the canister for creating a vacuum-induced airstream through the suction hose and canister, and a water filtration unit through which the airstream must flow before being admitted into the canister and exhausted to atmosphere through the vacuum unit. The water filtration unit includes a down tube coupled to the air inlet port of the canister, and cylindrical velocity ring. The velocity ring rests on the floor of the canister in a manner that allows the confined water to enter and partially fill the velocity ring. The down tube extends downward from the air inlet port and through the velocity ring substantially to the floor of the canister, and includes an air exit port through which the inlet air is released into the interior volume of the velocity ring well below the water level in the velocity ring.

BRIEF DESCRIPTION OF THE DRAWINGS

FIG. 4 is an exploded isometric diagram of the dust containment portion of the dust extraction apparatus of FIG. 3.

FIG. 5 is an exploded diagram of a clamshell adapter for the vacuum dust extraction apparatus of this invention.

DESCRIPTION OF THE PREFERRED EMBODIMENT

Figure 1:
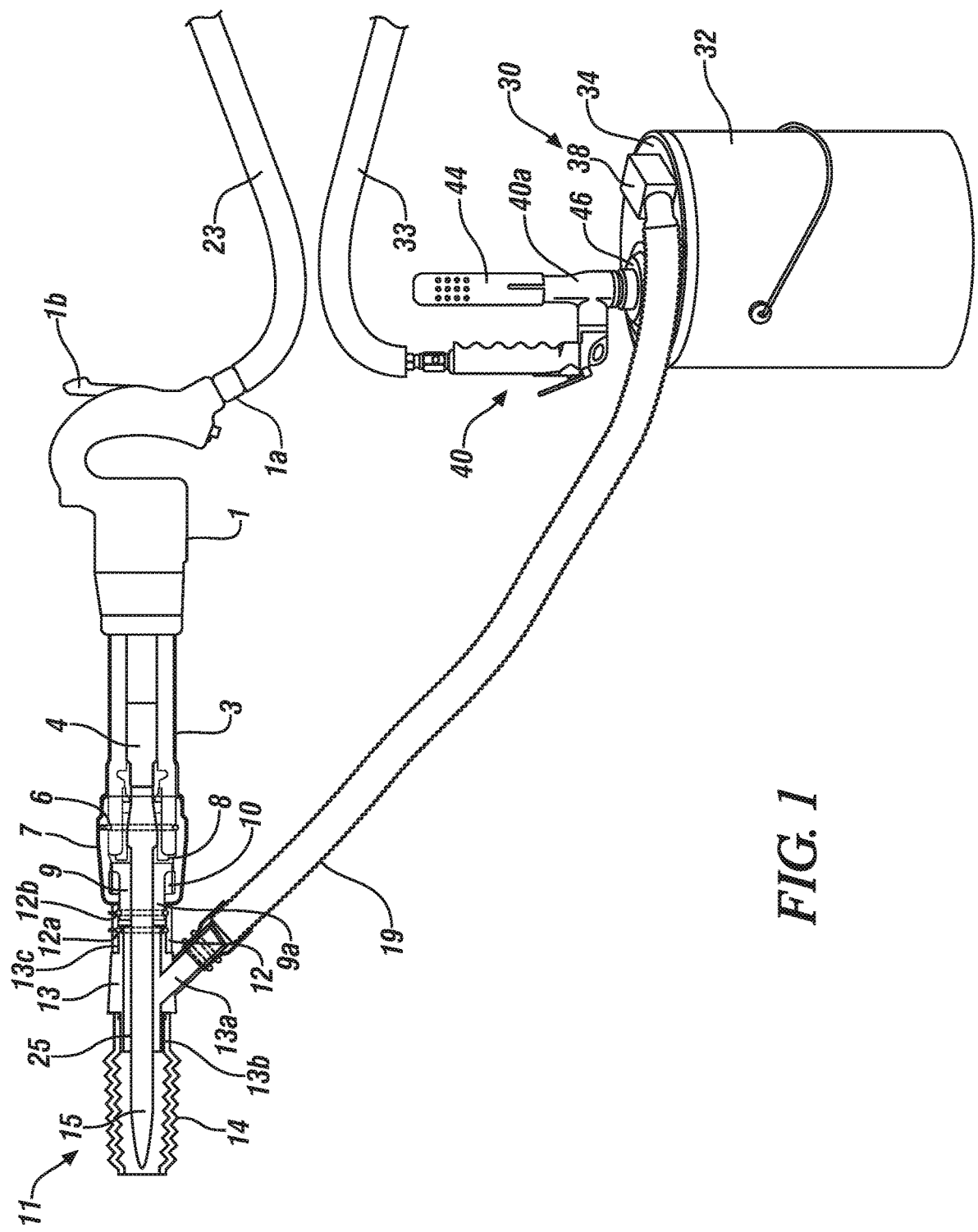
FIG. 1 is a diagram of the vacuum dust extraction apparatus of this invention, as applied to a percussive rivet buster air tool.
Figure 2:
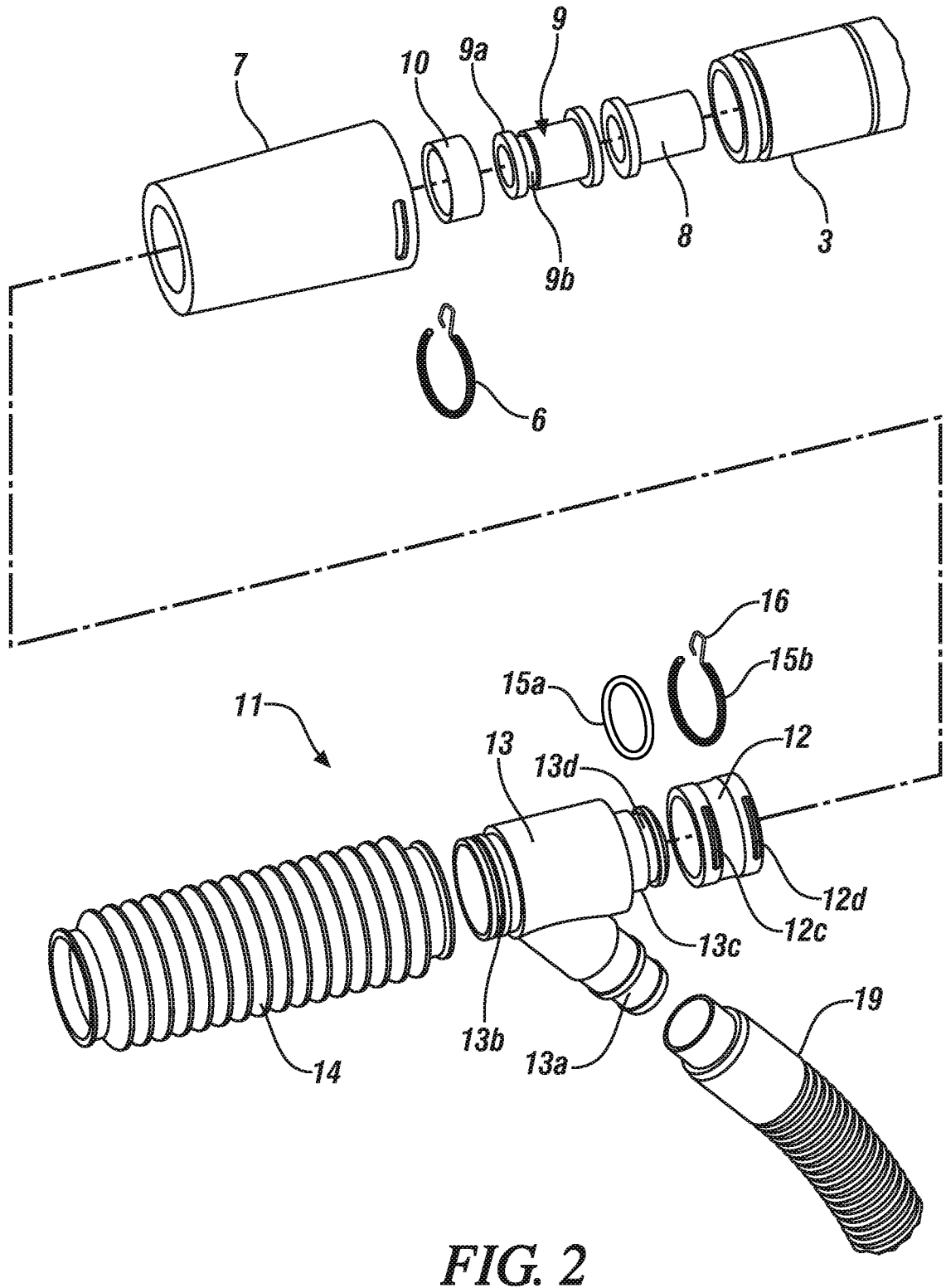
FIG. 2 is an exploded isometric diagram of the dust containment portion of the dust extraction apparatus of FIG. 1.
Figure 3:
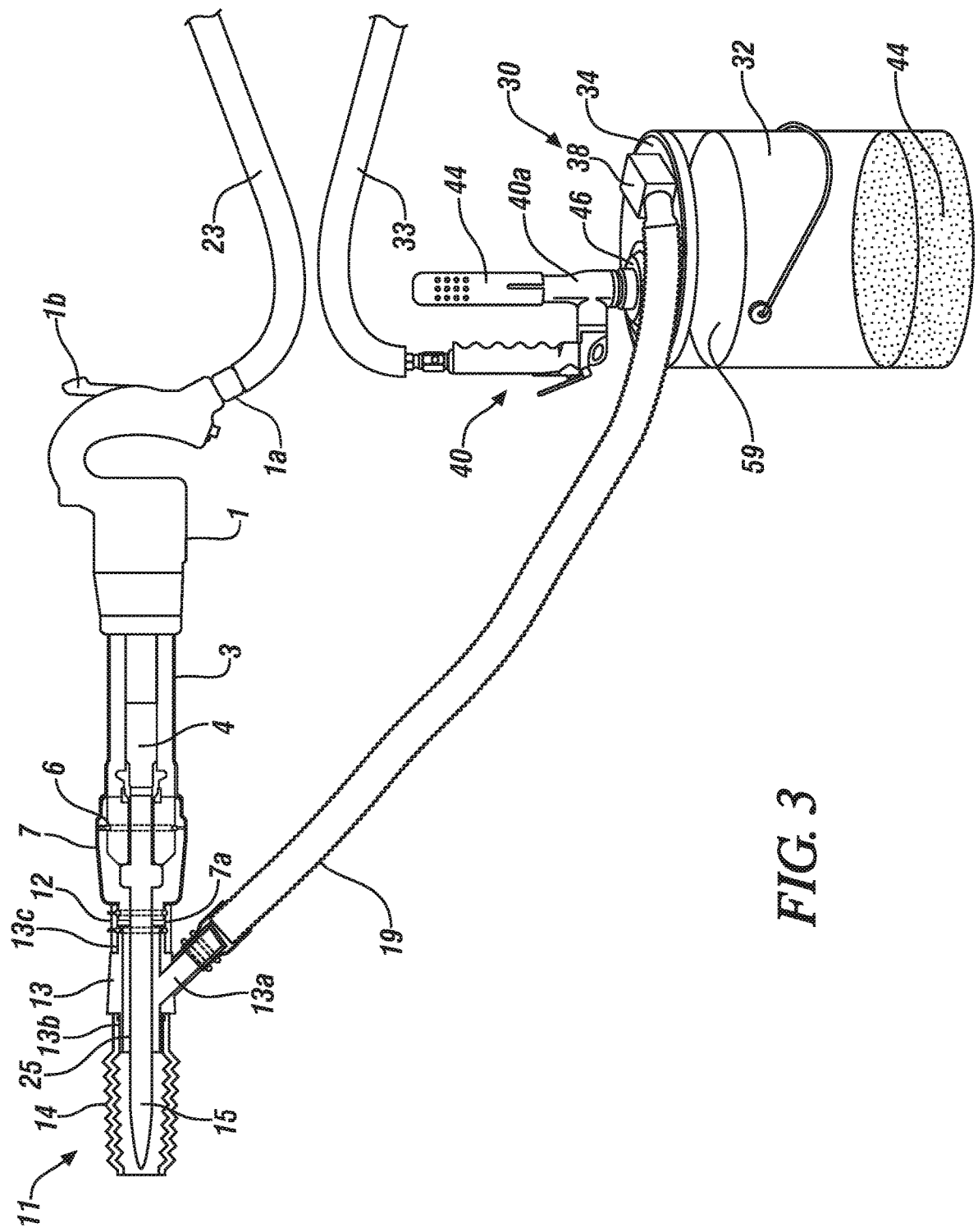
FIG. 3 is diagram of the vacuum dust extraction apparatus of this invention, as applied to a percussive chisel hammer air tool.

In general, the vacuum dust extraction apparatus of this invention is applicable to any percussive air tool, such as chipping hammers, riveting hammers, rivet busters, demolition tool drivers, pavement breakers, rock drills, and so on. FIGS. 1-2 illustrate an application of the vacuum dust extraction apparatus to a first type of percussive air tool, a rivet buster; and FIGS. 3-4 illustrate an application of the vacuum dust extraction apparatus to a second type of percussive air tool, a chisel hammer. The illustrated coupling arrangements can be applied to other types of air tools as well.

Referring to FIGS. 1-2, the vacuum dust extraction apparatus of this invention is illustrated as applied to an otherwise conventional percussive rivet buster air tool. The rivet buster has a tubular barrel 3 fitted with a handle 1 at one axial end and a retainer 7 at the other axial end. The handle 1, which may take various other shapes (D-shaped, or T-shaped, for example), includes an inlet port 1a adapted to be coupled to a source of compressed air by the air hose 23, an internal air passage coupling the inlet port 1a to a piston 4 by way of a control valve (not shown) operated by a trigger 1b integrated into the handle 1.

The implement or tool 15, a chisel in the illustration of FIG. 1, is received within the barrel 3 and an inner sleeve 8, and the retainer 7 is locked onto the barrel 3 with a retainer spring 6 to retain the chisel 15 within the barrel 3. Inward movement of the chisel 15 is limited by the inner sleeve 8, while outward movement of the chisel 15 is limited by an outer sleeve 9 and a tubular rubber bumper 10. The inboard end of the outer sleeve 9 is flanged; the rubber bumper 10 is disposed about the outer sleeve 9, and sandwiched between the flanged end of outer sleeve 9 and the outboard end of retainer 7. The outboard end of the outer sleeve 9 extends through the retainer 7, and terminates in a cylindrical sleeve 9a having a circumferential groove 9b on its exterior periphery, as best seen in FIG. 2. In a conventional rivet buster, the outer sleeve 9 would be entirely disposed within the retainer 7, but according to the present invention, the outboard end of the outer sleeve 9 is lengthened so as to protrude through the retainer 7 and provide an attachment point for the dust containment portion of the subject vacuum dust extraction apparatus, as described below.

The dust containment portion of the apparatus is generally designated in FIGS. 1-4 by the reference numeral 11. In general, the dust containment portion 11 includes a flexible dust bellows or boot 14 with accordion-style pleating, a snorkel 13, and a flexible suction hose 19 coupled to an outlet pipe 13a of the snorkel 13. The body of bellows 14 surrounds the chisel 15, extending substantially to the chisel's tip as shown in FIG. 1. Preferably, the bellows 14 is relatively transparent so as to not obstruct the user's view of the chisel 15 and the workpiece in the area of the chisel's tip; this also allows the user to visibly confirm that the bellows 14 is not getting clogged with dust. The inboard end of dust bellows 14 slides over a cylindrical sleeve 13b on the outboard end of snorkel 13. There is an annular cavity 25 between the chisel 15 and the inner periphery of the snorkel sleeve 13b so that dust generated by the action of the chisel 15 and drawn into the dust bellows 14 passes through the cavity 25 and the snorkel outlet pipe 13a. The inboard end of the snorkel 13 terminates in a cylindrical sleeve 13c having an outside diameter equal to that of the cylindrical sleeve 9a of outer sleeve 9. And similar to the cylindrical sleeve 9a, the cylindrical sleeve 13c has a circumferential groove 13d on its exterior periphery, as best seen in FIG. 2.

The snorkel 13 is coupled to the air tool's outer sleeve 9 by a tubular coupler 12. The tubular coupler 12 has an inside diameter slightly larger than the outside diameters of the cylindrical sleeves 13c and 9a, and is provided with a pair of spaced circumferential grooves 12a, 12b on its interior periphery that are axially aligned with a pair of slot openings 12c, 12d in the sidewall of the coupler 12. When the coupler 12 is slid over the cylindrical sleeve 13c on the inboard end of snorkel 13, the circumferential grooves 12a and 13d become axially aligned, and the coupler 12 is locked onto the snorkel 13 by a rubber O-ring 15a that fills the annular space defined by the aligned circumferential grooves 12a and 13d. Likewise, when the coupler 12 is slid over the extended cylindrical sleeve 9a on the outboard end of outer sleeve 9, the circumferential grooves 9b and 12b become axially aligned, and the coupler 12 is locked onto the outer sleeve 9 by a retainer spring 15b inserted into the coupler's slot opening 12d; when the retainer spring 15b is so inserted, it enters and fills an annular space defined by the aligned circumferential grooves 9b and 12b, and its tang 16 protrudes through the slot opening 12d to facilitate later removal of the retainer spring 15b.

Referring to FIGS. 3-4, the vacuum dust extraction apparatus of this invention is illustrated as applied to an otherwise conventional percussive chisel hammer air tool. The chisel hammer is like the rivet buster of FIGS. 1-2, except that there are no sleeves 8 and 9 to limit the percussive motion of the chisel 15. In this case, the common attachment point for the dust containment portion 11 of the vacuum dust extraction apparatus is provided by a modified retainer 7' that is used in place of the conventional retainer 7 of FIGS. 1-2. The modified retainer 7' is unique in that its outboard end terminates in a cylindrical sleeve 7a. The cylindrical sleeve 7a has an outside diameter equal to that of the cylindrical sleeve 13c of snorkel 13, and like the extended outer sleeve 9 of FIGS. 1-2, the cylindrical sleeve 7a has a circumferential groove 7b on its exterior periphery, as best seen in FIG. 4. The coupler 12, O-ring 15a, and retainer spring 15b of FIGS. 3-4 are identical to those described above in reference to FIGS. 1-2, only in this case, the retainer spring 15b locks the coupler 12 onto the cylindrical sleeve 7a of modified retainer 7'. That is, when the coupler 12 is slid over the cylindrical sleeve 7a, the circumferential grooves 7b and 12b become axially aligned, and the coupler 12 is locked onto the modified retainer 7' by the retainer spring 15b, which when inserted into the coupler's slot opening 12d, fills the annular space defined by the aligned circumferential grooves 7b and 12b, with the tang 16 protruding through the slot opening 12d.

FIG. 5 illustrates yet a third embodiment of an air tool attachment point for the coupler 12. In this embodiment, the air tool components are unchanged (as designated by the air tool barrel 3 and retainer 7), and the coupler attachment point is provided by a two-piece clamshell adapter that fits over the retainer 7. As viewed in the exploded view of FIG. 5, the clamshell adapter includes upper and lower halves 17 and 18 that are oppositely positioned about the retainer 7 and joined to form a tubular component that effectively encases the retainer 7. The adapter halves 17, 18 have outboard sleeve portions 17a, 18a with circumferential grooves 17b, 18b. When the adapter halves 17, 18 are joined to encase the retainer 7, the sleeve portions 17a, 18a form a cylindrical sleeve that extends outboard of the retainer 7, and the coupler 12 is joined to this cylindrical sleeve. That is, when the coupler 12 is slid over the adapter's cylindrical sleeve, the circumferential grooves 17b, 18b and 12b become axially aligned, and the coupler 12 is locked onto the adapter's cylindrical sleeve by the retainer spring 15b. The exterior peripheries of the adapter halves 17 and 18 are provided with a set of three spaced and axially aligned circumferential grooves so that when the adapter halves 17 and 18 are joined, they are secured together by three rubber O-rings (not shown) seated in the peripheral grooves.

Regardless of the air tool configuration, the suction hose 19 is coupled to a water filtration industrial vacuum 30. As best seen in FIGS. 1 and 3, the vacuum 30 generally comprises a standard 5-gallon metal pail or canister 32 and a metal lid 34 releasably secured to the upper rim of canister 32. The downstream end of suction hose 19 is fastened to the inlet of a vacuum port 38 mounted on the lid 34, and a vacuum unit 40 also mounted on the lid 34 creates a suction in the canister 32 that draws dust-laden air from the dust containment portion 11 into the canister 32, and then exhausts clean air to atmosphere. Although not shown in FIGS. 1, 3 and 6, the sidewall of the canister 32 preferably includes a number of circumferential ribs to impart additional stiffness and resistance to flexure.

The vacuum unit 40 is preferably a pneumatic vacuum operated by compressed air supplied from an air hose 33; the vacuum unit 40 includes a venturi 40a, and the compressed air is directed into venturi 40a through a distributed array of internal air passages (not shown) to create suction upstream of venturi 40a. In this case, the downstream or outlet end of the venturi 40a is vented to atmosphere through an exhaust diverter 44, and the upstream or inlet end of venturi 40 is coupled to a venturi mount 46 fastened to the lid 34 of the vacuum canister 30.

Figure 6:
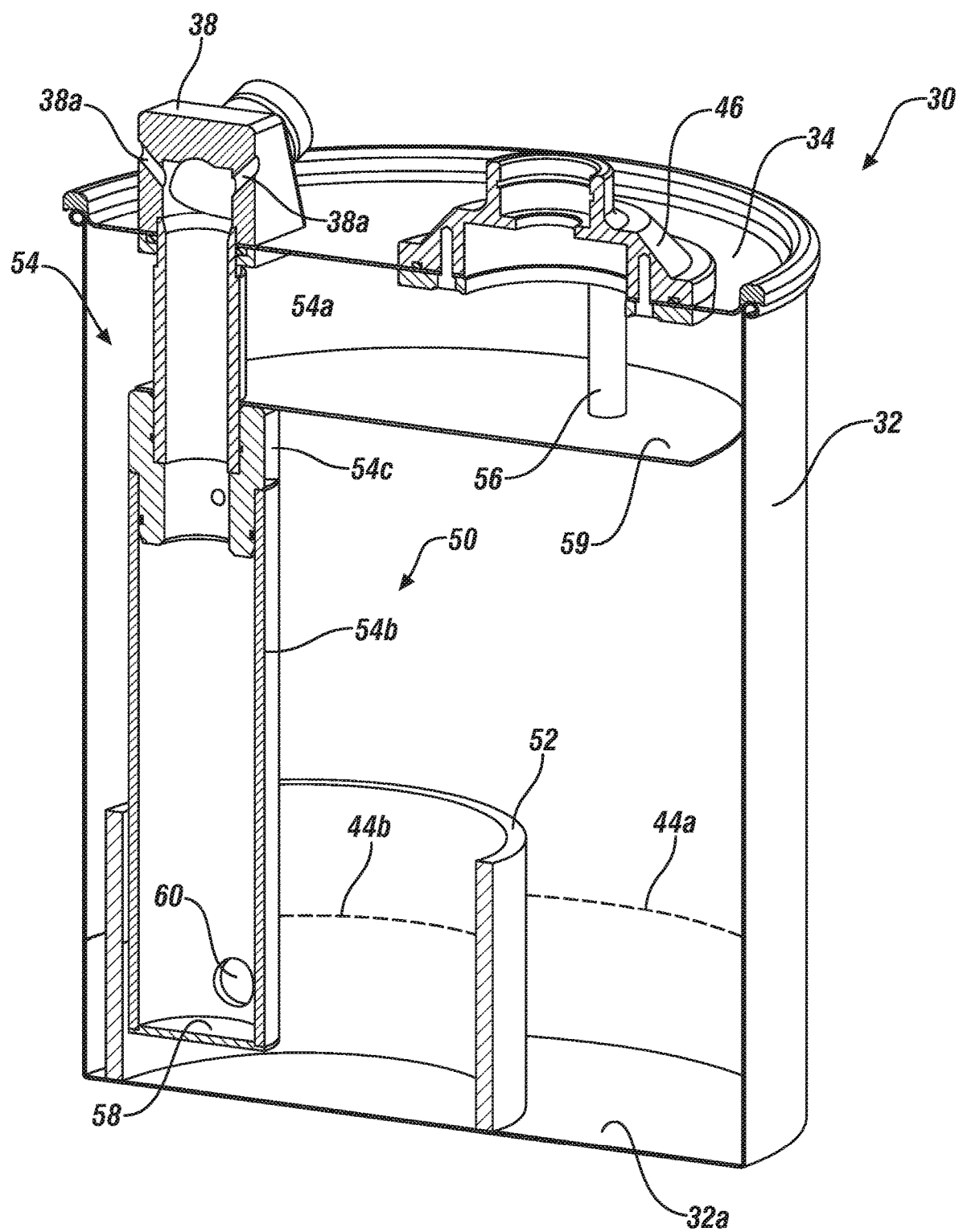
FIG. 6 is an isometric cross-sectional diagram of the water filtration industrial vacuum of FIGS. 1 and 3.

As illustrated in FIG. 3, a volume of water 44 (referred to herein as the confined water) is placed in the bottom of the canister 32, to a depth of approximately 3 inches, and the dust-laden air entering canister 32 via vacuum port 38 is cleansed of dust by a water filtration unit 50 (described below in reference to FIG. 6) housed within the canister 32 and partially submerged in the confined water 44. As shown in FIGS. 3 and 6, the vacuum 30 also includes a baffle disk 59 disposed in the upper portion of the canister 32, so that the cleansed air exiting water filtration unit 50 passes through the baffle disk 59 prior to being exhausted to atmosphere though the venturi 40a of vacuum unit 40. The purpose of the baffle disk 59 is primarily to prevent any of the confined water 44 from entering the venturi 40a.

Referring now to FIG. 6, the water filtration unit 50 includes a cylindrical velocity ring 52 supported on the bottom or floor 32a of canister 32, and a pipe arrangement 54 extending downward from the vacuum port 38 and into the velocity ring 52. In the illustrated embodiment, the velocity ring 52 is constructed of a section of six (6) inch PVC pipe that rests on the canister floor 32a. The height of velocity ring 52 is approximately five (5) inches, whereas the depth of the confined water 44 is typically about three (3) inches, as designated by the broken line 44a. In other words, the velocity ring 52 is supported on the floor 32a, partially submerged in the confined water 44. And since the velocity ring 52 is simply resting on canister floor 32a, the confined water 44 is free to flow under the velocity ring 52, filling the velocity ring 52 to substantially the same depth (that is, approximately three (3) inches deep) as designated by the broken line 44b. Other arrangements could be used, of course; for example, the velocity ring 52 could be fastened to the canister floor 32a, in which case some provision would possibly be required to allow the confined water 44 to flow into the velocity ring 52.

In the illustrated embodiment, the pipe arrangement 54 includes an upper pipe section 54a having a diameter similar to that of the suction hose 19 (an inside diameter of approximately one (1) inch in the illustrated embodiment) and secured to the outlet of vacuum port 38, a lower pipe section 54b having a diameter of approximately two (2) inches extending down into the velocity ring 52, and an adapter 54c coupling the upper and lower pipe sections 54a and 54b. In the illustrated embodiment, the upper pipe section 54a is constructed of metal, whereas the lower pipe section 54b is constructed of PVC. And as illustrated, the upper face of the adapter 54c also functions, along with one or more venturi mount stand-offs 56, to support the baffle disk 59. The bottom of the lower pipe section 54b is closed by a circular plate 58, and a small circular opening 60 in the sidewall of pipe section 54b just above the plate 58 defines an exit port through which the dust-laden air entering vacuum port 38 must pass. As suggested in FIG. 5, the diameter of the circular opening 60 is significantly smaller than that of the upper pipe section 54a: a diameter of approximately 9/16 inch in the illustrated embodiment. Other combinations of pipe could be used, but the illustrated arrangement has proven to be particularly efficacious for dust removal. As also shown in FIG. 6, the vacuum port 38 incorporates a number of drilled bleeder passages 38a that allow a small amount of atmospheric air to pass though the vacuum port's housing and join the dust-laden airstream drawn into the pipe arrangement 54 through the suction hose 19; this expedient has a relatively insignificant impact on the dust suction capability of the apparatus, but significantly reduces negative vacuum excursions within the canister 32 in the event that airflow through the dust containment portion 11 or suction hose 19 becomes partially or completely blocked for any reason.

The length of the pipe arrangement 54, particularly the length of the PVC pipe section 54b, is chosen so that the sidewall opening 60 is near the canister floor 32a, well submerged in the confined water 44 within velocity ring 52. Thus, the dust-laden air entering the vacuum port 38 exits the circular opening 60 well below the surface of the confined water 44 in a high velocity stream that creates a high degree of turbulence in the confined water within velocity ring 52, creating a frothy mixture that bubbles up and out of the velocity ring 52, and into the interior volume of the canister 32. This turbulent mixing of dust-laden air and confined water 44 within the velocity ring 52 tends to very thoroughly saturate or wet the airborne dust so that the air released into the canister in the space between the confined water 44 and baffle disk 59, and thereafter exhausted through the venturi 40a is virtually free of dust.

In summary, the vacuum dust extraction apparatus of the present invention operates to efficiently and effectively extract and capture dust produced by percussive impacting of an air tool's implement on a workpiece. The various elements of the apparatus may be sized differently than shown, and may be constructed of metal or plastic, as appropriate. And of course, it will be recognized that while the invention has been described in reference to the illustrated embodiments, numerous modifications and variations in addition to those mentioned herein will occur to those skilled in the art. For example, the tubular coupler 12 snorkel 13 could be formed as one piece, and so forth. Accordingly, it will be appreciated that systems incorporating these and other modifications and variations still fall within the intended scope of the invention.

The invention claimed is:

1. Vacuum dust extraction apparatus for an air tool that percussively drives an implement, comprising:
   a snorkel and bellows removably fastened to the air tool and surrounding an exposed portion of the implement for collecting dust produced when the implement percussively impacts a workpiece;
   a suction hose coupled to an outlet of said snorkel; and
   an industrial vacuum coupled to said suction hose, the vacuum including a canister holding a volume of confined water, a lid secured to a rim of said canister, a lid-mounted air inlet port to which said suction hose is coupled, a down pipe extending downward from said air inlet port into said confined water, and a lid-mounted pneumatically powered vacuum unit that creates a vacuum in said canister that draws dust-laden air in said snorkel and bellows through said suction hose, said inlet port, said down pipe, and said confined water before exhausting water-filtered air through said vacuum unit, where said air inlet port includes a bleeder passage through a wall of said air inlet port that allows atmospheric air from outside said dust extraction system to be drawn though said bleeder passage to join said dust-laden air in said inlet port and said down pipe.

2. Vacuum dust extraction apparatus for an air tool that percussively drives an implement, comprising:
   a snorkel and bellows removably fastened to the air tool and surrounding an exposed portion of the implement for collecting dust produced when the implement percussively impacts a workpiece;
   a suction hose coupled to an outlet of said snorkel;
   an industrial vacuum coupled to said suction hose, the vacuum including a canister holding a volume of confined water, a lid secured to a rim of said canister, a lid-mounted air inlet port to which said suction hose is coupled, a down pipe extending downward from said air inlet port into said confined water, and a lid-mounted pneumatically powered vacuum unit that creates a vacuum in said canister that draws dust-laden air in said snorkel and bellows through said suction hose, said down pipe, and said confined water before exhausting water-filtered air through said vacuum unit; and
   a cylindrical velocity ring partially submerged in said confined water and supported on a floor of said canister in a manner that permits said confined water to enter a space enclosed by said velocity ring, and such that said down pipe extends downward into said space, and into the confined water within said space.

3. The vacuum dust extraction apparatus of claim 2, where:
   said velocity ring rests on the floor of said canister in a manner that permits said confined water to flow under said velocity ring and into the space enclosed by said velocity ring.

4. The vacuum dust extraction apparatus of claim 2, where:
   said down pipe extends downward substantially to the floor of said canister; and
   said down pipe includes an underwater exit port proximate to the floor of said canister through which the dust-laden air is released into the confined water within said velocity ring.

5. The vacuum dust extraction apparatus of claim 4, where:
   said down pipe is closed at its end proximate to the floor of said canister.

6. The vacuum dust extraction apparatus of claim 4, where:
   said underwater exit port is formed in a sidewall of said down pipe.

7. Vacuum dust extraction apparatus for an air tool that percussively drives an implement, said air tool having a barrel, and a retainer locked onto said barrel to retain an inboard end of said implement within said barrel, said vacuum dust extraction system comprising:
   a snorkel and bellows removably fastened to the air tool and surrounding an exposed portion of the implement for collecting dust produced when the implement percussively impacts a workpiece, said snorkel having an inboard end that is removably fastened to a cylindrical sleeve of said air tool via a tubular coupler, where said air tool further includes an internal sleeve disposed within said retainer for limiting a percussive movement of said implement, and said cylindrical sleeve of said air tool is an extension of said internal sleeve that protrudes through said retainer at an outboard end thereof;
   a suction hose coupled to an outlet of said snorkel; and
   an industrial vacuum coupled to said suction hose, the vacuum including a canister holding a volume of confined water, a lid secured to a rim of said canister, a lid-mounted air inlet port to which said suction hose is coupled, a down pipe extending downward from said air inlet port into said confined water, and a lid-mounted pneumatically powered vacuum unit that creates a vacuum in said canister that draws dust-laden air in said snorkel and bellows through said suction hose, said down pipe, and said confined water before exhausting water-filtered air through said vacuum unit.

8. Vacuum dust extraction apparatus for an air tool that percussively drives an implement, said air tool having a barrel, and a retainer locked onto said barrel to retain an inboard end of said implement within said barrel, said vacuum dust extraction system comprising:
   a snorkel and bellows removably fastened to the air tool and surrounding an exposed portion of the implement for collecting dust produced when the implement percussively impacts a workpiece, said snorkel having an inboard end that is removably fastened to a cylindrical sleeve of said air tool via a tubular coupler, where said cylindrical sleeve of said air tool is an extension of a cylindrical sleeve formed on an outboard end of said retainer;
   a suction hose coupled to an outlet of said snorkel; and
   an industrial vacuum coupled to said suction hose, the vacuum including a canister holding a volume of confined water, a lid secured to a rim of said canister, a lid-mounted air inlet port to which said suction hose is coupled, a down pipe extending downward from said air inlet port into said confined water, and a lid-mounted pneumatically powered vacuum unit that creates a vacuum in said canister that draws dust-laden air in said snorkel and bellows through said suction hose, said down pipe, and said confined water before exhausting water-filtered air through said vacuum unit.

9. Vacuum dust extraction apparatus for an air tool that percussively drives an implement, said air tool having a barrel, and a retainer locked onto said barrel to retain an inboard end of said implement within said barrel, said vacuum dust extraction system comprising:
   a snorkel and bellows removably fastened to the air tool and surrounding an exposed portion of the implement for collecting dust produced when the implement percussively impacts a workpiece, said snorkel having an inboard end that is removably fastened to a cylindrical sleeve of said air tool via a tubular coupler, where said cylindrical sleeve of said air tool is a cylindrical sleeve formed on an outboard end of an adapter that is removably fastened to said retainer;
   a suction hose coupled to an outlet of said snorkel; and
   an industrial vacuum coupled to said suction hose, the vacuum including a canister holding a volume of confined water, a lid secured to a rim of said canister, a lid-mounted air inlet port to which said suction hose is coupled, a down pipe extending downward from said air inlet port into said confined water, and a lid-mounted pneumatically powered vacuum unit that creates a vacuum in said canister that draws dust-laden air in said snorkel and bellows through said suction hose, said down pipe, and said confined water before exhausting water-filtered air through said vacuum unit.

10. The vacuum dust extraction apparatus of claim 9, where:
   said adapter is a clamshell that encases said retainer.

\* \* \* \* \*